C. J. ELLIOTT & H. B. McCOOL.
CIRCULAR SAW MILL.
No. 174,503.　　　　　　　　　　Patented March 7, 1876.
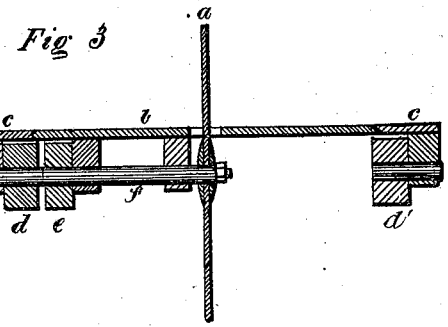
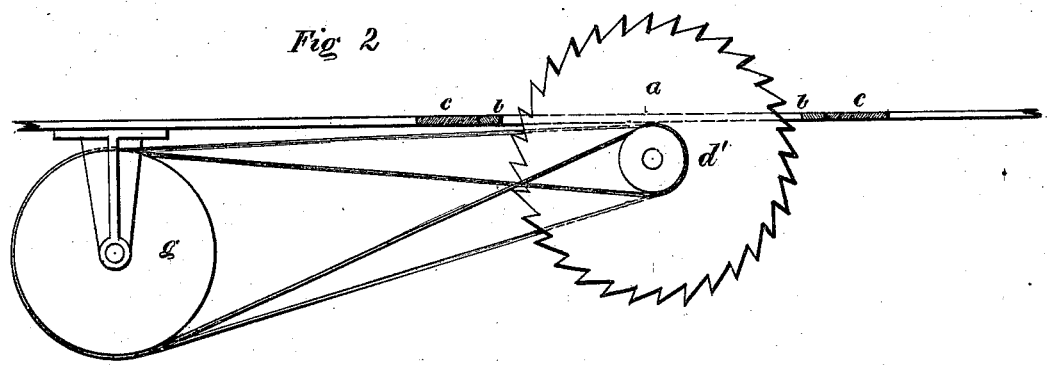
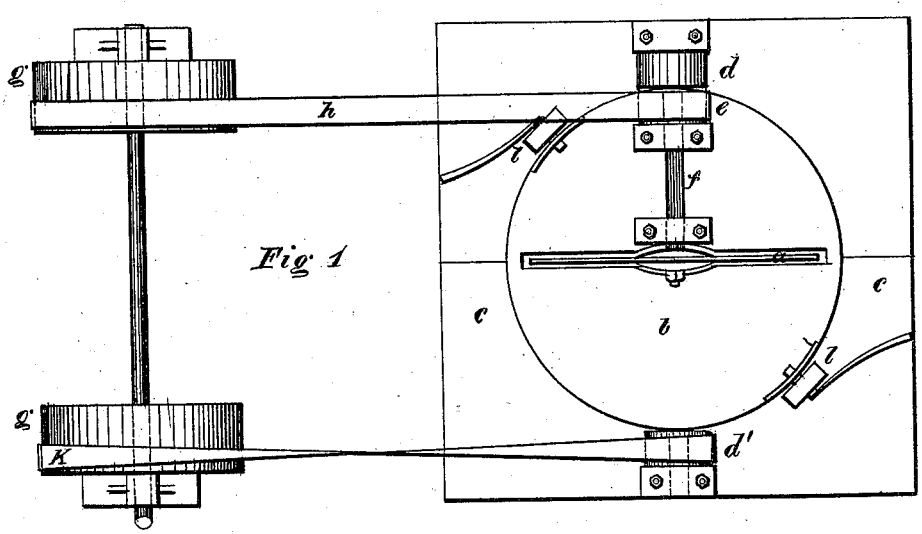

UNITED STATES PATENT OFFICE.

CHARLES J. ELLIOTT AND HORACE B. McCOOL, OF POTTSVILLE, PA., ASSIGNORS OF ONE-THIRD THEIR RIGHT TO WILLIAM H. BRIGHT, OF SAME PLACE.

IMPROVEMENT IN CIRCULAR-SAW MILLS.

Specification forming part of Letters Patent No. 174,503, dated March 7, 1876; application filed January 24, 1876.

*To all whom it may concern:*

Be it known that we, CHARLES J. ELLIOTT and HORACE B. McCOOL, of Pottsville, in the county of Schuylkill and State of Pennsylvania, have invented a new and useful Improvement in Circular-Saw Mills, which improvement is fully set forth in the following specification, reference being had to the accompanying drawings.

Our invention consists in the combination of a revolving base-plate, to which a saw, and mandrel having a pulley attached to it, are securely fastened; and suitable belts, pulleys, and machinery, as shown in the accompanying drawings, accomplish the object of our invention.

The idea is fully illustrated in Figures 1 and 2.

Fig. 1 is a plan view of the working apparatus, showing the saw $a$, revolving plate $b$, the plate $c$, which is made in either one or two parts, and in which the revolving plate $b$ moves in a groove, as is shown in the sectional views, Figs. 2 and 3, the pulley $e$, attached to the mandrel $f$, and which runs the saw, the hose-pulleys $d$ and $d'$, the driving-pulleys $g\ g$, the straight belt $h$, the crossed belt K, and the bolts or lugs $l\ l$.

Fig. 2 is a side sectional view of the invention, showing the saw and method of running it.

Fig. 3 is a front sectional view of the saw-plates $b$ and $c$, and the pulleys $e$, $d$, and $d'$.

The ordinary method of sawing lumber requires the log to be run back without sawing, after a single cut has been made. This requires almost as much power as to make a cut.

By our device we make a cut both forward and backward, and there is no power lost. As soon as the log has passed the saw we loosen the bolts or lugs $l\ l$, and turn the plate $b$ round until the saw is reversed. The crossed belt K on the loose pulley $d'$ is then slipped on the pulley $e$, which drives the saw, the log is run back, and a second cut is made, thus making the cutting capacity of the saw twofold greater than an ordinary one.

In ordinary saw-mills one of the greatest causes of the springing and ruining of saws is the running back of the log after a cut has been made, and the wearing of the saw, while cutting amounts to but little compared to the damage done by running the log back without cutting.

By the use of our invention this is prevented, as the log is cut every time it passes the saw both forward and backward.

By adjusting the saw any desirable distance from the center of the plate $b$, it may be made to cut two boards or planks of the same size, without a resetting of the log, the revolving plate $b$ acting as an eccentric and throwing the saw so much nearer to the log on its return past the saw.

From the drawings it will appear that the mode of working or revolving the plate $b$, which, when turned, reverses the saw, may be accomplished either by a rack and pinion, by levers, or by any device desired by the party using the invention.

The bolts or lugs $l\ l$ in Fig. 1 may be operated with springs, weights, or in any other desirable manner, and their use or purpose is to hold the plate $b$ firmly in its place.

It will readily be seen that in Fig. 1 the straight belt $h$ gives the saw a forward motion, and that the crossed belt K gives it a reversed motion. While the plate $b$ is being revolved both belts will be on the loose pulleys $d$ and $d'$, and as soon as the plate is in position the proper belt can be thrown on the pulley $e$, which will put the saw in operation. The working of the belts is to be done with the ordinary slide and lever apparatus.

The plate $b$ revolves in a groove in the plate $c$, and may be strengthened by guides or rests underneath.

The working parts of the device may be placed on top of or under the floor by slight changes of the machinery.

The working of the truck that carries the log is not shown, as it forms no part of the invention.

We claim as our invention—

1. The improved reversible-saw apparatus herein described, consisting of the saw $a$, the plates $b$ and $c$, the pulleys $d$, $d'$, and $e$, mandrel $f$, the belts $h$ and K, and the bolts or lugs $l\ l$, substantially as set forth.

2. The combination of the saw $a$, the revolving plate $b$, the stationary grooved plate $c$, the mandrel $f$, the pulleys $d$, $d'$, and $e$, the straight belt $h$, the crossed belt K, the pulleys $g\ g$, and the bolts or lugs $l\ l$, all combined and connected as and for the purpose described.

<div style="text-align:right">CHARLES J. ELLIOTT.<br>HORACE B. McCOOL.</div>

Witnesses:
 WILLIAM H. BRIGHT,
 MORGAN REED.